United States Patent [19]

Fucci et al.

[11] Patent Number: 4,819,954
[45] Date of Patent: Apr. 11, 1989

[54] FASTENER

[75] Inventors: Joseph G. Fucci, Holbrook; Melvyn J. L. Clough, Acton, both of Mass.

[73] Assignee: TRW Inc., Cleveland, Ohio

[21] Appl. No.: 36,332

[22] Filed: Apr. 9, 1987

[51] Int. Cl.⁴ .......................... F16J 15/12; F02F 11/00
[52] U.S. Cl. ................................ 277/235 B; 277/166; 277/180
[58] Field of Search .................... 277/235 B, 233, 234, 277/166, 180, 235 R; 384/297, 439, 416; 123/198 E, 195 C, 90.38; 411/352, 353, 377, 508, 509, 510

[56] References Cited

U.S. PATENT DOCUMENTS

| 3,299,737 | 1/1967 | Hurlin | 384/416 |
|---|---|---|---|
| 3,565,499 | 2/1971 | Fisher | 384/439 |
| 3,811,689 | 5/1974 | Farnam | 277/166 |
| 4,059,289 | 11/1977 | Morris et al. | 277/180 X |
| 4,202,311 | 5/1980 | Moriyoshi | 277/235 B X |
| 4,524,979 | 6/1985 | Bauder | 277/235 B X |
| 4,535,996 | 8/1985 | Cardis et al. | 277/235 B X |
| 4,535,999 | 8/1985 | Locacius | 277/166 X |
| 4,624,585 | 11/1986 | Nix et al. | 384/297 X |
| 4,655,463 | 4/1987 | Inciong et al. | 277/235 B |

Primary Examiner—Stanley N. Gilreath
Assistant Examiner—Katherine Matecki
Attorney, Agent, or Firm—Fay, Sharpe, Beall, Fagan, Minnich & McKee

[57] ABSTRACT

Disclosed is a plastic fastener component adapted to be molded into a gasket to provide means for securing the gasket to an associated structure while retaining a threaded fastener in an operative position. The component comprises a generally cylindrical body terminating in first and second axially spaced ends and having an axial opening of uniform transverse cross-section extending between the ends and adapted to receive the threaded fastener. The inner surface of the opening has axially extending ribs formed thereon. A circumferential flange extends radially outward about the first end of the body. The flange has a relatively thick and rigid portion adjacent the body and terminates in a relatively thin outer periphery. A plurality of flexible and resilient legs terminating in free end portions extend axially outward from the second end of the body. The legs are spaced circumferentially about the opening and each has a radially inward facing surface which forms a continuation of the ribs on the inner surface of the opening. Retaining elements are carried on the free end portions of the legs. The retaining elements including hook sections extending radially outward substantially beyond the maximum radial extent of the cylindrical body.

13 Claims, 1 Drawing Sheet

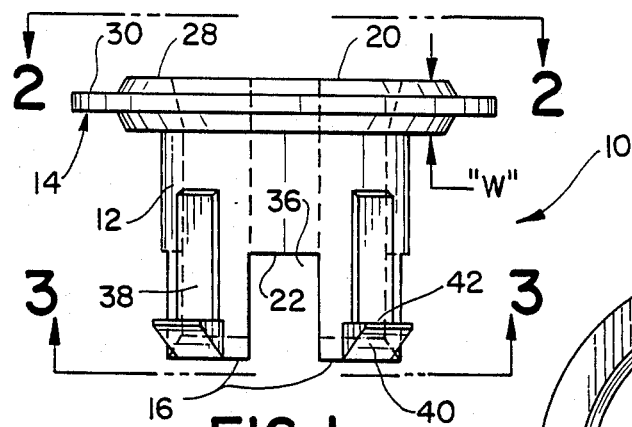
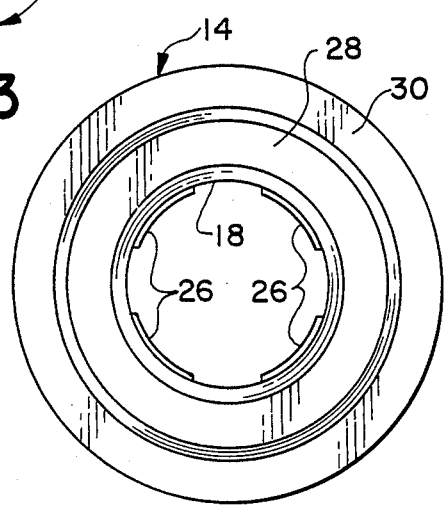
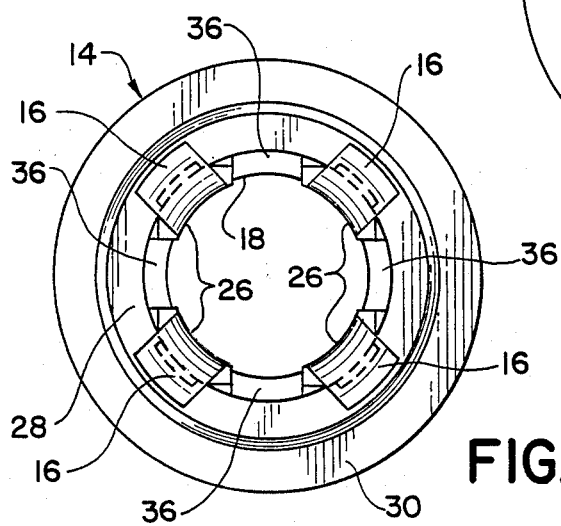
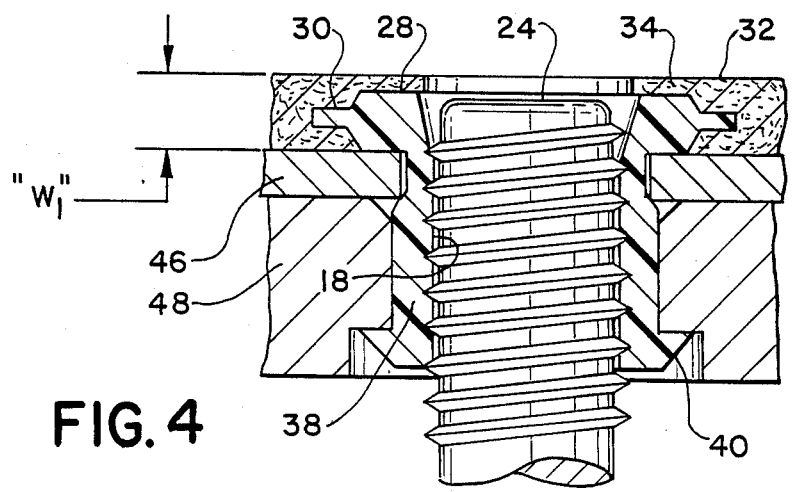
FIG. 1
FIG. 2
FIG. 3
FIG. 4

FASTENER

BACKGROUND OF THE INVENTION

The subject invention is directed toward the art of fasteners and, more particularly, to a molded plastic fastener component.

The invention is particularly intended and adapted for being molded into a gasket so that the component provides means for retaining the gasket in assembled position on associated covers or the like while retaining a threaded fastener in assembled position for subsequent connection of the gasket and cover to their final installed position.

In an effort to facilitate vehicle engine manufacture, it has been proposed to have the suppliers deliver certain components in partially assembled relationship. For example, it has been proposed to provide oil pan covers and their associated gaskets, brackets, and mounting bolts, as an assembled subassembly. By providing these components in preassembled relationship, inventory and assembly problems are significantly reduced.

The subject invention is particularly concerned with an improved fastener component which can be directly molded into the gasket and which will function to hold the gasket assembled to the oil pan cover and the associated bracket. In addition, the fastener allows the mounting bolts to be retained in position so that the entire assembly can be installed as a single unit merely by aligning it with the oil pan and tightening the mounting bolts or studs.

BRIEF DESCRIPTION OF THE INVENTION

According to the invention, the fastener component comprises a generally cylindrical plastic body which terminates in first and second axially spaced ends with an axial opening of uniform transverse cross-section extending therebetween. The opening is adapted to receive and hold a threaded fastener and the inner space of the opening has axially extending ribs formed thereon. Extending radially outward about the first end of the body is a circumferential flange which has a relatively thick and rigid portion adjacent the body and a relatively thin outer periphery. A plurality of flexible and resilient legs extend axially outward from the second end of the body. The legs terminate in free end portions which are spaced about the opening. Each of the legs has a radially inwardly facing surface which forms a continuation of the ribs on the inner surface of the opening. Retaining means are carried on the free end portions of the legs. Preferably, the retaining means include hook sections which extend radially outward substantially beyond the maximum radial extent of the cylindrical body.

To use the fastener component described above, the head of the component is positioned within the mold cavity of a gasket mold. Thereafter, the gasket material in injected into the mold and is molded about the thin peripheral edge portion of the circumferential flange to firmly bond the fastener component into the gasket with the cylindrical body portion of the component extending generally perpendicular to the plane of the gasket. The outwardly extending body portion allows the component to be forced through a circular opening in the oil pan cover and the associated bracket. During insertion of the leg portions collapse or deflect radially inward and after passing through the openings spring outwardly to their normal position. The hooked means thus engage behind the bracket, thereby clamping the gasket, the oil pan cover, and the bracket into assembled relationship. Suitable mounting bolts can then be inserted into the fastener component in position for connecting the entire subassembly to the oil pan.

BRIEF DESCRIPTION OF THE DRAWINGS

The above and other objects and advantages will become apparent from the following description when read in conjunction with the accompanying drawings wherein:

FIG. 1 is a side elevational view of a fastener component formed in accordance with the subject invention;

FIG. 2 is a top view of the component of FIG. 1 (the view is taken on line 2—2 of FIG. 1);

FIG. 3 is a bottom view of the component of FIG. 1 (the view is taken on line 3—3 of FIG. 1); and, FIG. 4 is a transverse cross-sectional view showing the FIG. 1 component in assembled position.

Referring more particularly to the drawings wherein the showings are for the purpose of illustrating a preferred embodiment of the invention only and not for the purpose of limiting same; FIGS. 1–3 show the overall relationship of the component 10 which generally comprises a body section 12, a rim or flange section 14 and a plurality of resilient legs 16. The component 10 is molded as a unitary structure from a suitable plastic such as nylon. In the embodiment illustrated, the body section 12 is generally cylindrical and includes a cylindrical through opening 18 which extends axially from the first or upper end 20 to the second or lower end 22. The opening 18 is sized so as to closely receive a suitable associated fastener 24 (see FIG. 4) with an interference fit sufficient to maintain the fastener 24 in position in opening 18. Preferably, the interior surface of opening 18 includes a plurality of axially extending raised portions 26 (see FIGS. 2 and 3). In the embodiment shown, there are four of the raised sections 26 positioned about the interior of the opening at uniformly spaced locations. The innermost surface of the raised portions 26 is preferably arcuate and located on the same center as the main inner wall of opening 18. The raised sections 26 provide a convenient means for controlling the engagement between the inner wall of the opening 18 and the threaded fastener 24. Additionally, the raised portions 26 allow for tolerance variations in the diameter of the threaded fastener without resulting in a great increase in the force required to drive the fastener into the opening when the fastener is slightly oversized.

As previously mentioned, the subject fastener component 10 is designed to be molded into an oil pan gasket to extend generally perpendicular to the sealing surfaces of the gasket. In order to permit the component 10 to be suitably molded into the gasket, the component is provided with the radially extending flange 14. As illustrated, the flange 14 is circumferentially continuous about the first end 20 of body 12. Flange 14 includes a first relatively thick section 28 which preferably has a thickness "W" which is slightly less than the total thickness of the gasket into which the component is to be molded. The relationship between the thickness "W" of the flange section 24 and its relationship to the overall thickness of the gasket will subsequently be described. For the present, however, it is sufficient to note that the flange 14 terminates in an outer circumferentially continuous, narrow web section 30 which is preferably located to extend generally centrally from section 28.

The relationship of the flange section 14 to the associated gasket can best be understood by reference to FIG. 4. As shown therein, the component 10 has been molded into a gasket 32 having a thickness "$W_1$". Preferably, the flange section 28 has a thickness "W" which is a controlled amount less than the total thickness "$W_1$" of the gasket 32. Thus, in the molding operation, a predetermined, relatively thin portion 34 of the gasket material extends over the flange portion 28. The total thickness of flange portion 28 relative to the total gasket thickness 32 thus limits the amount of compression that can be applied to the gasket when the threaded fastener 24 is tightened into the associated oil pan. The fastener component 10 is, however, firmly held in position in the gasket 32 by the relatively thin outwardly extending terminal end portion 30 of the flange. As shown in FIG. 4, the location of the thin flange portion 30 assures that gasket material will totally enclose this portion of the flange.

Referring again to FIGS. 1–3, it will be noted that the previously mentioned flexible legs 16 extend axially from the second end 22 of the body 12. In the embodiment shown there are four of the legs 16 uniformly spaced about the end of body 12. The legs are spaced from one another by open areas 36. Preferably, and as shown in FIGS. 2 and 3, the inwardly facing surfaces of the legs 16 form a continuation of the raised sections 26 of the opening 18. In addition, and for reasons which will subsequently be described, each of the legs 16 is provided on its outer surface with a reinforcing rib or section 38. Preferably, the ribs 38 are somewhat narrower than the main portion of the legs and extend axially the full length of the legs and throughout a portion of the exterior extend of body section 12. At their outer free end, the legs 16 are provided with hook-type retaining means 40. Each of the hook-type retaining means has a generally wedge shaped configuration and tapers radially outwardly from the free end to a shoulder 42 which extends generally perpendicular to the axis of the fastener component 10.

Referring again to FIG. 4, the overall use and function of the component 10 can best be understood. As previously mentioned, FIG. 4 shows the component 10 molded in a gasket member 32 to extend perpendicularly therefrom. The locations of the components 10 in the gasket 32 are, of course, selected to correspond to the location of preformed openings in an associated oil pan cover 46 and a cover bracket or frame member 48. In addition, the spacing from the shoulder 42 to the underside of the flange 14 is selected so as to substantially equal or be only slightly larger than the combined thickness of the oil pan cover 46 and the bracket or frame member 48. With the oil pan cover 46 and the bracket member 48 suitably aligned, the gasket 32 is put into position and the individual fastener components 10 forced through the aligned openings. As the component is forced into the openings, the legs 16 deflect radially inward until the hook means 40 pass completely through the assembly. At that time, they deflect outwardly and the gasket, the oil pan cover, and the bracket member are firmly assembled and held as a unitary subassembly by the fastener component 10. Thereafter, suitable mounting bolts or threaded fasteners 24 can be run into the center opening 18 to the position shown in FIG. 4. The entire subassembly is then ready for installation on the oil pan of a vehicle engine. Note that by merely positioning the assembly in location on the oil pan, the threaded fasteners can be tightened into suitable threaded openings on the oil pan drawing the cover and gasket into sealed position on the oil pan. Because of the presence of the flange section 28, the total compression applied to the gasket is controlled. Thus, it is not possible to overtighten the gasket or bend the bracket or pan cover in a manner which might produce an undesirable leak.

Referring again to the reinforcing ribs 38, it will be noted from FIG. 4 that their upper ends terminate just below cover 36. The effective diameter of the fastener measured over the reinforcing ribs is slightly greater than the diameter of the openings in the cover 46. This provides a preliminary retention of the gasket 32 to the cover 46 even when the bracket member 48 is not in place. In addition, the ribs 38 strengthen the legs 16 in their area of engagement with bracket member 48.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

Having thus described the invention, it is claimed:

1. A plastic fastener component adapted to be molded into a gasket to provide means for securing the gasket to an associated structure and retaining a threaded fastener, said fastener component comprising:

a generally cylindrical body terminating in first and second axially spaced ends and having an axial opening of uniform transverse cross-section extending between said ends and adapted to receive a threaded fastener;

a circumferential flange extending radially outward about the first end of said body, said flange having a relatively thick and rigid portion adjacent said body and terminating in a relatively thin outer periphery;

a plurality of flexible and resilient leg members extending axially outward from the second end of said body and terminating in free end portions, said legs being spaced circumferentially about said opening, each leg having a radially inwardly facing surface which forms a continuation of the inner surface of said opening, said inwardly facing surface of each leg and the corresponding axially aligned portions of the inner surface of said opening extending radially inward relative to the remaining portions of the inner surface of said opening to define a plurality of axially extending raised portions for engaging a threaded fastener positioned in said opening; and, retaining means carried on the free end portions of said legs, said retaining means including hook sections extending radially outward substantially beyond the maximum radial extent of said cylindrical body.

2. The fastener component as defined in claim 1 wherein said legs include raised reinforcing sections extending in an axial direction from said hook sections to said cylindrical body.

3. The fastener component as defined in claim 2 wherein said reinforcing sections are located on the exterior surface of said legs and continuations of said reinforcing sections extend along at least a portion of the outer surface of said generally cylindrical body.

4. The fastener component as defined in claim 1 wherein said thin outer periphery of said circumferential flange is located axially centrally of said thick and rigid portion.

5. The fastener component as defined in claim 1 wherein said legs are positioned in diametrically opposed pairs.

6. The fastener component as defined in claim 5 wherein said flange is circumferentially continuous and said relatively thick and rigid portion defines a surface which is generally perpendicular to the axis of said body and faces said hook sections.

7. The fastener component as defined in claim 5 wherein each of said hook sections are axially tapered and have a shoulder surface facing said flange.

8. In combination:
- an oil pan cover member having a peripheral mounting flange provided with a plurality of bolt receiving openings;
- a resilient sealing gasket member overlying said mounting flange, said sealing gasket including fastener members molded therein at locations corresponding to the locations of said bolt receiving openings;
- each said fastener member including a body having an axial opening, said body terminating at one end in a radial flange which is molded into said gasket and at the other end in resilient legs which extend through the associated bolt receiving opening, said legs including means carried thereon for retaining said legs in said bolt receiving openings to thereby retain said gasket in position on said flange; and
- a threaded mounting bolt interference fitted in each said axial opening in operative position for subsequently mounting said gasket and said cover to an oil pan.

9. The combination as defined in claim 8 wherein a predetermined relatively thin layer of said gasket overlies said radial flange.

10. The combination as defined in claim 8 wherein said means for retaining said legs in said bolt receiving openings comprise hook-like elements which extend radially.

11. The combination as defined in claim 8 wherein said radial flange of said fastener member has a thickness of a predetermined amount less than the thickness of said gasket to prevent overcompression of said gasket when said oil pan cover is joined to an oil pan.

12. The combination as defined in claim 8 wherein said radially inwardly extending raised portions have arcuate surfaces for engaging said mounting bolts.

13. The combination as defined in claim 8 wherein said radial flange has a relatively thick portion adjacent said body and a relatively thin outer periphery.

* * * * *

UNITED STATES PATENT AND TRADEMARK OFFICE
CERTIFICATE OF CORRECTION

PATENT NO. : 4,819,954
DATED     : April 11, 1989
INVENTOR(S) : Fucci, et al.

It is certified that error appears in the above—identified patent and that said Letters Patent is hereby corrected as shown below:

In the Brief Description of the Invention:

column 1, line 57 reading "material in injected" should read --material is injected--; and column 1, line 65 reading "During insertion of the leg" should read --During insertion the leg--.

In the Brief Description of the Drawings:

column 2, line 64 reading "of the flange section 24" should read --of the flange section 28--.

Signed and Sealed this

Twenty-fourth Day of October, 1989

*Attest:*

DONALD J. QUIGG

*Attesting Officer*       *Commissioner of Patents and Trademarks*